United States Patent [19]

Kunitomi et al.

[11] Patent Number: 5,310,823
[45] Date of Patent: May 10, 1994

[54] POLYACETAL RESIN COMPOSITION

[75] Inventors: Masaki Kunitomi; Hiromitsu Ishii, both of Nagoya; Yoshiyuki Yamamoto, Suzuka, all of Japan

[73] Assignee: Toray Industries, Inc., Japan

[21] Appl. No.: 23,147

[22] Filed: Feb. 24, 1993

Related U.S. Application Data

[63] Continuation of Ser. No. 465,193, filed as PCT/JP89/00623, Jun. 22, 1989, abandoned.

[30] Foreign Application Priority Data

Jun. 22, 1988 [JP] Japan .................. 63-154386

[51] Int. Cl.$^5$ .................. C08L 67/02; C08L 59/02; C08L 59/04
[52] U.S. Cl. .................. 525/400; 525/80; 525/90; 525/92; 525/93; 525/154; 524/155; 524/157; 524/158; 524/161; 524/282
[58] Field of Search .............. 525/400, 417, 154, 400, 525/80, 90, 92, 93; 524/155, 157, 158, 161, 282

[56] References Cited

U.S. PATENT DOCUMENTS

| | | | |
|---|---|---|---|
| 4,117,033 | 9/1978 | Gale | 260/860 |
| 4,169,867 | 10/1979 | Burg et al. | 525/417 |
| 4,596,616 | 6/1986 | Noda et al. | 428/102 |
| 4,605,591 | 8/1986 | Nose et al. | 428/332 |
| 4,649,179 | 3/1987 | Takagaki | 525/398 |
| 4,983,660 | 12/1991 | Yoshida et al. | 524/456 |

FOREIGN PATENT DOCUMENTS 0004973 10/1979 European Pat. Off. .

OTHER PUBLICATIONS

2nd Edition, *Encyclopedia of Polymer Science & Engineering*, pp. 99-115, 1985.

*Primary Examiner*—James J. Seidleck
*Assistant Examiner*—W. Robinson H. Clark
*Attorney, Agent, or Firm*—Austin R. Miller

[57] ABSTRACT

A polyacetal resin composition having a volume resistivity lower than $10^{14}$ [Ω·cm], which comprises (A) 100 parts by weight of a polyacetal resin and (B) 1 to 100 parts by weight of a polyether ester block copolymer which is derived from (a) a dicarboxylic acid component composed mainly of terephthalic acid, (b) a glycol component composed mainly of 1,4-butanediol and (c) a poly(ethylene oxide)glycol having a number average molecular weight of 500 to 20,000 and has a poly(ethylene oxide) dicarboxylate unit content of 20 to 95% by weight, has excellent antistatic characteristics and mechanical characteristics, and especially a high impact resistance.

9 Claims, No Drawings

POLYACETAL RESIN COMPOSITION

This application is a continuation of application Ser. No. 07/465,193, filed as PCT/JP89/00623, Jun. 22, 1989, now abandoned.

TECHNICAL FIELD

The present invention relates to a polyacetal resin composition having a permanent antistatic property and an excellent impact resistance.

BACKGROUND ART

A polyacetal resin is an engineering plastic having a well-balanced mechanical strength and impact resistance and is widely used as automobile parts and mechanical structural components of electrical and electronic equipment.

The polyacetal resin has a high volume resistivity and surface resistivity and thus has an excellent electrically insulating property, but, because of its good electrically insulating characteristics, static electricity is easily generated, and therefore, the polyacetal resin has a problem in that it cannot be used for electrical parts which are likely to suffer electrostatic problems, or for dustproof parts.

Methods for imparting an antistatic property to a polyacetal resin by incorporating various antistatic agents into the polyacetal resin have been proposed. For example, as the antistatic agent having a relatively low molecular weight, an N,N-bis(alkoxy)amine (Japanese Examined Patent Publication No. 46-1857) and an ester of glycerol with a monofatty acid and boric acid (Japanese Unexamined Patent Publication No. 50-151952) are known.

As the antistatic agent having a high molecular weight, a polyether-esteramide block copolymer comprising a nylon and poly(tetramethylene oxide)glycol (Japanese Unexamined Patent Publication No. 59-191752) is known.

Moreover, there is known a method comprising incorporating a polyether ester block copolymer comprising polybutylene terephthalate and a polyoxolane having a relatively low molecular weight as the poly(alkylene oxide)glycol into a polyacetal resin (Japanese Unexamined Patent Publication No. 51-64560).

The low-molecular-weight antistatic agents disclosed in Japanese Examined Patent Publication No. 46-1857 and Japanese Unexamined Patent Publication No. 50-151952, however, have problems in that a bleeding of the antistatic agents occurs and the commercial value of products is reduced, and when the products are washed with water, the antistatic agents are removed by the water washing and the antistatic property is lowered.

The polyether-esteramide block copolymer comprising nylon 12 and poly(tetramethylene oxide)glycol, disclosed in Japanese Unexamined Patent Publication No. 59-191752, does not have a satisfactory antistatic property and satisfactory mechanical characteristics, because the antistatic property of the poly(tetramethylene oxide) chain is low, the compatibility between a polyacetal resin and the polyether-esteramide block copolymer is poor, and the size of dispersed particles is large.

The polyether-ester block copolymer comprising polybutylene terephthalate and a polyoxolane having a relatively low molecular weight, disclosed in Japanese Unexamined Patent Publication No. 51-64560, has a poor antistatic property and a poor compatibility with a polyacetal resin, as well as the above-mentioned polyether-esteramide block copolymer, and therefore, there is little improvement of the mechanical characteristics of the polyacetal resin and the antistatic property is not satisfactory. The same may be said of poly(alkylene oxide) chains other than the chain of (ethylene oxide) units, for example, poly(propylene oxide) chains.

Therefore, an object of the present invention is to provide a polyacetal resin composition having a permanent antistatic property and excellent mechanical characteristics.

The inventors carried out research with a view to solving the above problem, and as a result found that, if a polyether-ester block copolymer having a specific copolymerization composition, in which the polyether component is a poly(ethylene oxide)glycol residue having a specific molecular weight, is incorporated into a polyacetal resin, the above-mentioned object can be attained. The present invention is based on this finding.

DISCLOSURE OF THE INVENTION

The object of the present invention is to provide a polyacetal resin composition having a permanent antistatic property and excellent mechanical characteristics.

More specifically, in accordance with the present invention, there is provided a polyacetal resin composition having a volume resistivity not higher than $10^{-}[\Omega\cdot cm]$, which comprises (A) 100 parts by weight of a polyacetal resin and (B) 1 to 100 parts by weight of a polyether-ester block copolymer which is derived from (a) a dicarboxylic acid component composed mainly of terephthalic acid, (b) a glycol component composed mainly of 1,4-butanediol and (c) a poly(ethylene oxide)-glycol having a number average molecular weight of 500 to 20,000 and has a poly(ethylene oxide) dicarboxylate unit content of 20 to 95% by weight.

BEST MODE FOR CARRYING OUT THE INVENTION

By the polyacetal resin (A) used in the present invention are meant an oxymethylene homopolymer and an oxymethylene copolymer containing in the main chain at least 85% by weight of oxymethylene units and up to 15% by weight of oxyalkylene units having 2 to 8 adjacent carbon atoms.

The process for the preparation of the oxymethylene homopolymer and oxymethylene copolymer is not particularly critical, and the homopolymer and copolymer can be prepared by known preparation processes.

As the typical process for the preparation of an oxymethylene homopolymer, there can be mentioned a process comprising introducing substantially anhydrous formaldehyde into an organic solvent containing a basic polymerization catalyst such as an organic amine, carrying out the polymerization and stabilizing the formed polymer, for example, by acetylation with acetic anhydride.

As a typical example of a process for the preparation of an oxymethylene copolymer, there can be mentioned a process comprising polymerizing substantially anhydrous trioxane and a copolymerization component such as ethylene oxide or 1,3-dioxolene directly or in a solvent such as cyclohexane by using a Lewis acid catalyst such as boron trifluoride-diethyl etherate, and decomposing and removing unstable terminals by a basic compound.

The polyether-ester block copolymer (B) used in the present invention is a segmented block copolymer comprising hard segments composed mainly of butylene terephthalate units and soft segments composed mainly of poly(ethylene oxide) terephthalate units.

The dicarboxylic acid component constituting hard segments consists solely of terephthalic acid or comprises at least 70 mole % of terephthalic acid and up to 30 mole % of an aromatic dicarboxylic acid such as isophthalic acid, phthalic acid, naphthalene-2,6-dicarboxylic acid, diphenyl-4,4'-dicarboxylic acid or 3-sulfoisophthalic acid, an alicyclic dicarboxylic acid such as 1,4-cyclohexanedicarboxylic acid, 1,2-cyclohexanedicarboxylic acid or dicyclohexyl-4,4'-dicarboxylic acid, or an aliphatic dicarboxylic acid such as oxalic acid, succinic acid, adipic acid, azelaic acid, sebacic acid, dodecanoic acid or dimer acid. Among these copolymerization components, preferably used are isophthalic acid, adipic acid, sebacic acid and dodecanoic acid.

The diol component constituting the hard segments is composed mainly of 1,4-butanediol. Namely, the diol component consists solely of 1,4-butanediol or comprises at least 50 mole % of 1,4-butanediol and up to 50 mole % of a copolymerization component such as ethylene glycol, diethylene glycol, propylene glycol, 1,6-hexanediol, 1,10-decanediol, 1,4-dihydroxymethylcyclohexane, bis(4-hydroxyethoxyphenyl)methane or neopentyl glycol.

The dicarboxylic acid component constituting the soft segments is composed mainly of terephthalic acid. As well as the dicarboxylic acid component of the hard segments, the dicarboxylic acid component of the soft segments consists solely of terephthalic acid or comprises at least 70 mole % of terephthalic acid and up to 30 mole % of a dicarboxylic acid other than terephthalic acid as the copolymerization component. As the copolymerization component, there can be mentioned dicarboxylic acids, as exemplified above with respect to the hard segments.

A poly(ethylene oxide)glycol having a number average molecular weight of 500 to 20,000 is used as the poly(ethylene oxide)glycol constituting the poly(ethylene oxide) terephthalate units of the soft segments. A poly(ethylene oxide)glycol having a number average molecular weight of 5,000 to 15,000 is preferable, and in view of the permanent antistatic property and the compatibility with a polyacetal resin, a poly(ethylene oxide)glycol having a number average molecular weight of 8,000 to 10,000 is especially preferable. If the number average molecular weight is lower than 500, the permanent antistatic effect is too low, and if the number average molecular weight is higher than 20,000, the compatibility with the butylene terephthalate units of the hard segments is poor and a homogeneous polyether-ester block copolymer cannot be prepared.

In the polyether-ester block copolymer used in the present invention, the composition ratio between the hard segments composed mainly of butylene terephthalate units and the soft segments [poly(ethylene oxide) carboxylate units] composed mainly of poly(ethylene oxide) terephthalate units is such that the content of poly(ethylene oxide) carboxylate units is 20 to 95% by weight, preferably 30 to 95% by weight, more preferably 75 to 95% by weight, most preferably 80 to 90% by weight. If the content of the poly(ethylene oxide) carboxylate units is lower than 20% by weight, the compatibility with the polyacetal resin is poor and the antistatic effect is too low. If the content of the poly(ethylene oxide) carboxylate units is higher than 95% by weight, the polymerization for the polyether-ester block copolymer becomes difficult, and the mechanical strength of the composition is lowered.

The process for the preparation of the polyether-ester block copolymer is not particularly critical, and the polyether-ester block copolymer can be prepared by known ordinary processes. For example, the polyether-ester block copolymer can be prepared according to a process comprising charging (a) terephthalic acid (or dimethyl terephthalate), (b) 1,4-butanediol and (c) poly(ethylene oxide)glycol into a reaction vessel equipped with a rectifying column, carrying out the esterification reaction (or the ester exchange reaction) under atmospheric or elevated pressure, and advancing the polymerization under atmospheric or a reduced pressure. Alternatively, the polyether-ester block copolymer can be prepared according to a process comprising forming a polybutylene terephthalate oligomer from (a) terephthalic acid (or dimethyl terephthalate) and (b) 1,4-butanediol in advance, adding (c) poly(ethylene oxide)glycol to the oligomer, and advancing the polymerization under atmospheric or a reduced pressure.

In the present invention, the amount of the polyether-ester block copolymer added is 1 to 100 parts by weight, preferably 2 to 50 parts by weight, per 100 parts by weight of the polyacetal resin. If the amount of the polyether-ester block copolymer added is smaller than 1 part by weight, the permanent antistatic effect is poor, and if the amount of the polyether-ester block copolymer added exceeds 100 parts by weight, the characteristics, especially the mechanical strength, of the polyacetal resin are greatly lowered.

The process for the preparation of the polyacetal resin composition of the present invention is not particularly critical, but a process comprising melt-kneading the polyacetal resin with the polyether-ester block copolymer is preferably adopted. As the melt-kneading process, there can be adopted a process in which the melt kneading is carried out at a temperature of 120° to 280° C. by using, for example, a Banbury mixer, a roll kneader or a single-screw or twin-screw extruder.

In the polyacetal resin composition of the present invention, preferably the polyether ester-block copolymer is dispersed in the form of fine particles having an average dispersed particle size not larger than 2 μm, especially not larger than 1 μm, in the polyacetal resin. If the average dispersed particle size of the polyether ester block copolymer exceeds 2 μm, the permanent antistatic effect is poor and the mechanical strength is often lowered.

To further improve the antistatic effect, a cationic surface active agent represented by a quaternary ammonium compound such as dodecyltrimethylammonium chloride or octadecyltrimethylammonium chloride, an anionic surface active agent represented by a sodium alkylbenzenesulfonate such as sodium dodecylbenzenesulfonate or sodium n-dodecylbenzenesulfonate, or a metal salt of an organic carboxylic acid, or a nonionic surface active agent represented by a compound having a poly(ethylene oxide)glycol structure, such as polyoxyethylene stearyl ether or polyoxyethylene phenol ether, can be added to the polyacetal resin composition of the present invention. The surface active agent is incorporated in an amount of 0.05 to 20 parts by weight, preferably 0.1 to 10 parts by weight, per 100 parts by weight of the polyacetal resin. If the amount of the surface active agent added is smaller than 0.05 part by weight, the effect of assisting the antistatic property is low, and if the amount of the surface active agent exceeds 20 parts by weight, the mechanical strength becomes poor.

Furthermore, a known hindered phenol type, phosphite type, thioether type or amine type antioxidant, a benzophenone type or hindered amine type weathering agent, a formaldehyde scavenger such as melamine, dicyandiamide, a polyamide or a polyvinyl alcohol copolymer, a release agent such as a fluorine-containing polymer, a silicone oil, a metal salt of stearic acid, a metal salt of montanic acid, a montanic acid ester wax or a polyethylene wax, a colorant such as a dye or a pigment, an ultraviolet light screening agent such as titanium oxide or carbon black, a reinforcer such as a glass fiber, a carbon fiber or a potassium titanate fiber, a filler such as silica, clay, calcium carbonate, calcium sulfate or glass bead, a nucleating agent such as talc, a flame retardant, a plasticizer, an adhesive assistant and a sticking agent can be incorporated into the polyacetal resin composition, as long as the attainment of the object of the present invention is not hindered. Furthermore, to improve the mechanical strength of the polyacetal resin composition of the present invention, another thermoplastic polymer or thermoplastic elastomer can be incorporated.

The polyacetal resin composition of the present invention has a volume resistivity not higher than $10^{14}$ [$\Omega$·cm], preferably not higher than $10^{13}$ [$\Omega$·cm], and an excellent permanent antistatic property. Accordingly, the polyacetal resin composition of the present invention can be used for electrical and electronic parts which are likely to suffer from electrostatic problems, and various dustproof parts.

The present invention will now be described in detail with reference to the following examples. In the examples, all of "%" and "parts" are by weight. The relative viscosity ($\eta r$) is a value measured at 25° C. with respect to a polymer solution having a concentration of 0.5% in o-chlorophenol as the solvent. The mechanical properties, surface resistivity $\rho s$, volume resistivity $\rho v$, average particle diameter, MI value and melting point were measured according to the following methods.

Molding:

Using an injection molding machine having an injection capacity of 5 ounces, dumbbell specimens of ASTM #1, Izod impact test pieces and square plates having a thickness of 3 mm were molded at a cylinder temperature of 200° C., a mold temperature of 80° C., and a molding cycle of 40 seconds.

Mechanical Properties:

Using the dumbbell specimen of ASTM #1 obtained by the above-mentioned injection molding, the tensile strength was measured according to the method of ASTM D-638, and using the Izod impact test piece, the impact strength was measured according to the method of ASTM D-256.

Electrical Characteristics:

Using the square plate of 80 mm×80 mm×3 mm (thickness) obtained by the above-mentioned injection molding, the surface resistivity and volume resistivity were measured. Furthermore, the initial surface resistivity and the surface resistivity after 10 hours, boiling water treatment and drying were measured by using the above-mentioned square plate.

Dispersed Particle Diameter:

The average dispersed particle diameter of the polyether-ester block copolymer in the polyacetal resin was measured by using a transmission electron microscope.

MI Value:

The MI value was measured according to the method of ASTM D-1238 at a temperature of 190° C. under a load of 2160 g.

Melting Point:

The melting point was measured at a temperature-elevating rate of 10° C./min by DSC (differential scanning calorimeter).

As the polyacetal resin copolymer was used a polymer copolymerized with ethylene oxide, which had an MI value of 9.0 g/10 min and a melting point of 167° C. As the polyacetal resin homopolymer was used a polymer having terminals stabilized by acetylation, which had an MI value of 9.0 g/10 min and a melting point of 175° C.

REFERENTIAL EXAMPLE 1

A reaction vessel provided with helical ribbon type stirring vanes was charged with 79.4 parts of dimethyl terephthalate, 9.84 parts of poly(ethylene oxide)glycol having a number average molecular weight of 8,000, 54.9 parts of 1,4-butanediol and 0.05% (based on the polymer) of a titanium tetrabutoxide catalyst, and the mixture was heated at 190° to 225° C. for 3 hours to effect ester exchange reaction. Then the temperature was elevated to 245° C., and the pressure in the system was reduced to 1 mmHg over a period of 50 minutes. Under these conditions, polymerization was carried out for 2.5 hours. The obtained polymer was extruded in the form of a strand into water and then cut to obtain a pellet. The polymer is designated as polymer A-1. Polymers A-2, A-3, A-4, A-5 and A-6 having compositions shown in Table 1 were prepared by carrying out the polymerization in the same manner as described above. The relative viscosity ($\eta r$) of each of the obtained polymers is shown in Table 1.

TABLE 1

| | Copolymerization Composition of Polyether-Ester Block Copolymer | | |
|---|---|---|---|
| | Copolymerization Composition | | |
| No. | Butylene terephthalate units (parts) | Poly(ethylene oxide)terephthalate units (parts) | Relative Viscosity ($\eta r$) |
| A-1 | 90 | 10 | 1.58 |
| A-2 | 70 | 30 | 1.72 |
| A-3 | 50 | 50 | 2.11 |
| A-4 | 20 | 80 | 2.90 |
| A-5 | 10 | 90 | 2.98 |
| A-6 | 3 | 97 | 3.10 |

REFERENTIAL EXAMPLE 2

A reaction vessel was charged with 48.7 parts of dimethyl terephthalate, 63.5 parts of poly(ethylene oxide)glycol having a number average molecular weight of 500 and 13.5 parts of 1,4-butanediol, and the polymerization was carried out in the same manner as described in Referential Example 1. The obtained polymer is designated as polymer B-1. Polymers B-2, B-3, B-4, B-5, B-6 and B-7 were prepared in the same manner by using poly(ethylene oxide)glycols having molecular weights of 3,000, 8,000, 15,000 and 25,000, polyoxolane having a number average molecular weight of 1,000 and poly(tetramethylene oxide)glycol having a molecular weight of 1,000, respectively. In each of polymers B-1 through B-7, the hard segment/soft segment composition ratio was 20/80 (by weight). The relative viscosity of each of the obtained polymers is shown in Table 2.

that the addition of the polyether ester block copolymer increases the Izod impact strength and reduces the volume resistivity and surface resistivity. From the foregoing results, it is seen that the composition of the present invention has an excellent mechanical characteristic and antistatic property.

TABLE 3

Characteristics of Polyacetal Resin Composition Molded Articles

| No. | Kind of Polyether Ester Block Copolymer | Tensile Strength [MPa] | Izod Impact Strength [J/m] | Volume Resistivity [Ω · cm] | Surface Resistivity [Ω] Initial Value | Change after Boiling Water Treatment |
|---|---|---|---|---|---|---|
| Comparative Example 1 | — | 59 | 62 | $6.9 \times 10^{15}$ | $5.5 \times 10^{15}$ | not observed |
| Comparative Example 2 | A-1 | 57 | 63 | $9.0 \times 10^{14}$ | $7.2 \times 10^{15}$ | not observed |
| Example 1 | A-2 | 54 | 64 | $3.2 \times 10^{13}$ | $1.8 \times 10^{13}$ | not observed |
| Example 2 | A-3 | 52 | 67 | $9.4 \times 10^{12}$ | $4.2 \times 10^{12}$ | not observed |
| Example 3 | A-4 | 50 | 82 | $6.0 \times 10^{12}$ | $3.2 \times 10^{12}$ | not observed |
| Example 4 | A-5 | 48 | 83 | $9.2 \times 10^{11}$ | $8.0 \times 10^{11}$ | not observed |
| Comparative Example 3 | A-6 | 47 | 59 | $8.0 \times 10^{11}$ | $6.8 \times 10^{11}$ | observed |
| Example 5 | B-1 | 48 | 68 | $9.1 \times 10^{12}$ | $5.6 \times 10^{12}$ | not observed |
| Example 6 | B-2 | 49 | 74 | $8.2 \times 10^{12}$ | $3.6 \times 10^{12}$ | not observed |
| Example 7 | B-3 | 52 | 85 | $5.3 \times 10^{12}$ | $2.8 \times 10^{12}$ | not observed |
| Example 8 | B-4 | 50 | 80 | $6.0 \times 10^{12}$ | $2.9 \times 10^{12}$ | not observed |
| Comparative Example 4 | B-5 | 42 | 36 | $8.2 \times 10^{12}$ | $6.2 \times 10^{12}$ | observed |
| Comparative Example 5 | B-6 | 52 | 68 | $2.0 \times 10^{15}$ | $1.4 \times 10^{15}$ | not observed |
| Comparative Example 6 | B-7 | 55 | 66 | $1.5 \times 10^{15}$ | $1.0 \times 10^{15}$ | not observed |
| Comparative Example 7 | — | 58 | 59 | $3.1 \times 10^{12}$ | $1.1 \times 10^{12}$ | observed |

Relative Viscosities of Polyether-Ester Block Copolymers

| No. | Soft Segment Constituent-Molecular Weight | Relative Viscosity ($\eta r$) |
|---|---|---|
| B-1 | poly(ethylene oxide)glycol-500 | 1.27 |
| B-2 | poly(ethylene oxide)glycol-3,000 | 2.66 |
| B-3 | poly(ethylene oxide)glycol-8,000 | 3.21 |
| 8-4 | poly(ethylene oxide)glycol-15,000 | 3.92 |
| B-5 | poly(ethylene oxide)glycol-25,000 | 5.08 |
| B-6 | polyoxolane-1,000 | 2.13 |
| B-7 | poly(tetramethylene oxide)glycol-1,000 | 2.40 |

EXAMPLES 1 THROUGH 8 AND COMPARATIVE EXAMPLES 1 THROUGH 6

To 100 parts of the polyacetal resin copolymer was added 10 parts of the polyether ester block copolymer obtained in Referential Example 1 or 2, and the mixture was melt-kneaded at a cylinder temperature of 185° C. by using a twin-screw extruder having a screw diameter of 30 mm. The characteristics of the molded articles are shown in Table 3.

When the results of Example 3 are compared with the results of Comparative Example 1 in Table 3, it is seen

EXAMPLES 8 THROUGH 11 AND COMPARATIVE EXAMPLE 8

To 100 parts of the polyacetal resin copolymer was added the polyether-ester block copolymer (A-4) in an amount of 0 to 120 parts, and kneading was carried out in the same manner as described in Example 1. The physical properties of the obtained molded articles are shown in Table 4.

When the results of Example 9 are compared with the results of Comparative Example 1 in Table 4, it is seen that the addition of the polyether ester block copolymer increases the Izod impact strength and reduces the volume resistivity and surface resistivity. From the foregoing results, it is seen that the composition of the present invention has an excellent mechanical characteristic and antistatic property.

TABLE 4

Characteristics of Polyacetal Resin composition Molded Articles

| No. | Amount of Polyether-Ester Block Copolymer A-4 Added to Poly-Acetal Resin (parts) | Tensile Strength [MPa] | Izod Impact Strength [J/m] | Volume Resistivity [Ω · cm] | Surface Resistivity [Ω] |
|---|---|---|---|---|---|
| Comparative Example 1 | 0 | 60 | 62 | $6.0 \times 10^{15}$ | $5.5 \times 10^{15}$ |
| Example 8 | 1 | 58 | 65 | $8.5 \times 10^{13}$ | $4.0 \times 10^{13}$ |
| Example 3 | 10 | 50 | 82 | $6.0 \times 10^{12}$ | $3.2 \times 10^{12}$ |
| Example 9 | 30 | 36 | 90 | $4.3 \times 10^{12}$ | $2.2 \times 10^{12}$ |
| Example 10 | 60 | 25 | 220 | $3.2 \times 10^{12}$ | $1.1 \times 10^{12}$ |
| Example 11 | 100 | 21 | 310 | $2.7 \times 10^{12}$ | $1.8 \times 10^{12}$ |
| Comparative Example 8 | 120 | 16 | 270 | $2.9 \times 10^{12}$ | $2.0 \times 10^{12}$ |

EXAMPLES 12 AND 13

To 100 parts of the polyacetal resin copolymer or homopolymer were added 10 parts of the polyether-ester block copolymer (A-4) and 1 part of sodium dodecylbenzenesulfonate, and the mixture was kneaded in the same manner as described in Example 1. The physical properties of the obtained molded articles are shown in Table 5. From the results shown in Table 5, it is seen that the composition of the present invention has an excellent mechanical characteristic and antistatic property.

TABLE 5

| No. | Kind of Polymer | Amount of Polymer A-4 Added to Polyacetal Resin (parts) | Tensile Strength [MPa] | Izod Impact Strength [J/m] | Volume Resistivity [$\Omega \cdot cm$] | Surface Resistivity [$\Omega$] Initial Value | Change after Boiling Water Treatment |
|---|---|---|---|---|---|---|---|
| Example 12 | Copolymer | 10 | 78.2 | 89 | $1.1 \times 10^{13}$ | $4.2 \times 10^{12}$ | observed |
| Example 13 | Homopolymer | 10 | 75.2 | 87 | $1.3 \times 10^{13}$ | $5.1 \times 10^{12}$ | observed |

EXAMPLE 14

To 100 parts of the polyacetal resin copolymer was added 20 parts of the polyether-ester block copolymer (A-4), and the mixture was kneaded in the same manner as described in Example 1. In the obtained composition, the average dispersed particle diameter was 1 $\mu$m, the volume resistivity was $5.0 \times 10^{12}$ [$\Omega \cdot cm$], and the surface resistivity was $2.4 \times 10^{12}$ [$\Omega$].

In contrast, in Comparative Example 4, wherein 10 parts of the polyether-ester block copolymer B-4 was kneaded with 100 parts of the polyacetal resin copolymer, the average dispersed particle diameter was 8 $\mu$m, and in Comparative Example 6, wherein PTMG was used as the constituent of the soft segments, the average dispersed particle diameter was 5 $\mu$m. It is seen that the composition of the present invention, in which the average dispersed particle diameter is smaller than 2 $\mu$m, is excellent.

INDUSTRIAL APPLICABILITY

The resin composition of the present invention can be widely used for electrical parts which are likely to suffer electrostatic problems, for example, gears and shafts of cassette tapes, and various dustproof parts.

We claim:

1. A polyacetal resin composition having a volume resistivity not larger than $10^{14}$ ($\Omega \cdot cm$), which comprises (A) 100 parts by weight of a polyacetal resin, (B) 1 to 100 parts by weight of a polyether-ester block copolymer which is derived from (a) a dicarboxylic acid component composed mainly of terephthalic acid, (b) a glycol component composed mainly of 1,4-butanediol and (c) a poly(ethylene oxide)glycol having a number average molecular weight of 500 to 20,000 and has a poly(ethylene oxide) dicarboxylate unit content of 20 to 95% by weight, and (C) 0.05 to 20 parts by weight of a compound selected from the group consisting of sodium alkylbenzenesulfonates and metal salts of an organic carboxylic acid.

2. A polyacetal resin composition according to claim 1, wherein the volume resistivity is not larger than $10^{13}$ [$\Omega \cdot cm$].

3. A polyacetal resin composition according to claim 1, wherein the number average molecular weight of the poly(ethylene oxide)glycol is 5,000 to 15,000.

4. A polyacetal resin composition according to claim 1, wherein the number average molecular weight of the poly(ethylene oxide)glycol is 8,000 to 10,000.

5. A polyacetal resin composition according to claim 1, wherein the content of poly(ethylene oxide) carboxylate units is 75 to 95% by weight.

6. A polyacetal resin composition according to claim 1, wherein the content of poly(ethylene oxide) carboxylate units is 80 to 90% by weight.

7. A polyacetal resin composition according to claim 1, which comprises 2 to 50 parts by weight of the polyether-ester block copolymer.

8. The composition defined in claim 1 wherein said compound (C) is incorporated in an amount of 0.1 to 10.0 parts by weight per 100 parts by weight of polyacetal resin.

9. The composition according to claim 1 wherein the sodium alkylbenzenesulfonates are sodium dodecylbenzenesulfonate.

* * * * *

UNITED STATES PATENT AND TRADEMARK OFFICE
CERTIFICATE OF CORRECTION

PATENT NO. : 5,310,823
DATED : May 10, 1994
INVENTOR(S) : Masaki Kunitomi et al

It is certified that error appears in the above-indentified patent and that said Letters Patent is hereby corrected as shown below:

In Column 2, line 30, please delete "10-[Ω·cm]" and substitute --$10^{14}$ [Ω·cm]--.

In Table 2, under the column "No." kindly delete the fourth entry "8-4" and substitute --B-4--.

Signed and Sealed this

Thirtieth Day of August, 1994

Attest:

BRUCE LEHMAN

Attesting Officer

Commissioner of Patents and Trademarks